United States Patent
Yeh

(10) Patent No.: US 9,879,410 B2
(45) Date of Patent: Jan. 30, 2018

(54) COLD BATHING WATER TO TOILET DIVERTING APPARATUS

(71) Applicant: Zhenrong W. Yeh, Temple City, CA (US)

(72) Inventor: Zhenrong W. Yeh, Temple City, CA (US)

(*) Notice: Subject to any disclaimer, the term of this patent is extended or adjusted under 35 U.S.C. 154(b) by 296 days.

(21) Appl. No.: 14/656,364

(22) Filed: Mar. 12, 2015

(65) Prior Publication Data

US 2015/0185737 A1    Jul. 2, 2015

Related U.S. Application Data

(63) Continuation-in-part of application No. 13/044,911, filed on Mar. 10, 2011, now abandoned.

(51) Int. Cl.
| | |
|---|---|
| *A47K 4/00* | (2006.01) |
| *E03C 1/01* | (2006.01) |
| *E03D 5/00* | (2006.01) |
| *G05D 9/02* | (2006.01) |
| *E03B 1/04* | (2006.01) |
| *F03B 13/00* | (2006.01) |

(52) U.S. Cl.
CPC .............. *E03D 5/003* (2013.01); *E03B 1/048* (2013.01); *F03B 13/00* (2013.01); *G05D 9/02* (2013.01); *F05B 2220/20* (2013.01); *F05B 2220/602* (2013.01); *Y02B 10/50* (2013.01); *Y02E 10/28* (2013.01); *Y10T 137/7287* (2015.04); *Y10T 137/7358* (2015.04); *Y10T 137/8376* (2015.04); *Y10T 137/86187* (2015.04)

(58) Field of Classification Search
CPC ........................................................ E03C 1/01
USPC ....................................................... 4/663–664
See application file for complete search history.

(56) References Cited

U.S. PATENT DOCUMENTS

| | | | | |
|---|---|---|---|---|
| 4,206,520 A | * | 6/1980 | Fulford | E03D 9/08 4/420.2 |
| 4,646,780 A | * | 3/1987 | Spooner | E03D 1/003 137/426 |
| 5,201,082 A | * | 4/1993 | Rockwell | E03D 5/003 4/406 |
| 5,228,152 A | * | 7/1993 | Fraley | A47K 4/00 4/664 |
| 5,243,719 A | * | 9/1993 | McDonald | E03B 1/04 4/415 |
| 5,303,728 A | * | 4/1994 | Senatore | E03D 1/32 137/113 |
| 5,524,666 A | * | 6/1996 | Linn | E03B 1/04 122/13.3 |

(Continued)

*Primary Examiner* — Lori Baker

(57) ABSTRACT

A cold bathing water to toilet diverting apparatus includes a diverter that is configured to be fluidly couplable to a bathing water conduit. The diverter is positionable between a shut off valve and a spout each fluidly coupled to the bathing water conduit. An outlet conduit is fluidly coupled to the diverter. The diverter diverts water from the bathing water conduit and into the outlet conduit when the diverter detects water in the diverter having a temperature less than a threshold temperature. A storage tank is fluidly coupled to the outlet conduit to receive water from the diverter. An auxiliary conduit is fluidly coupled to the storage tank and is configured to be fluidly coupled to a toilet's water tank to allow the storage tank to supply water to the water tank through the auxiliary conduit.

11 Claims, 5 Drawing Sheets

(56) References Cited

U.S. PATENT DOCUMENTS

| | | | |
|---|---|---|---|
| 5,791,401 A | | 8/1998 | Nobile |
| 5,845,346 A | * | 12/1998 | Johnson, Jr. .............. E03B 1/04 |
| | | | 4/665 |
| 5,862,544 A | | 1/1999 | Placencia |
| 6,032,687 A | * | 3/2000 | Linn .......................... E03B 1/04 |
| | | | 137/337 |
| 6,328,882 B1 | | 12/2001 | Rosenblatt |
| 6,481,028 B1 | | 11/2002 | Hsia |
| 2007/0118981 A1 | * | 5/2007 | Kovey ...................... E03D 3/00 |
| | | | 4/300.2 |
| 2007/0261161 A1 | | 11/2007 | Avigdor |
| 2008/0196156 A1 | | 8/2008 | Brewin |
| 2009/0188032 A1 | | 7/2009 | Yeung |

\* cited by examiner

COLD BATHING WATER TO TOILET DIVERTING APPARATUS

PRIORITY DATA

This application is a Continuation in Part of U.S. patent application Ser. No. 13/044,911 filed on Mar. 10, 2011 and I hereby claim the benefit thereof under Title 35, United States Code, Section 120.

BACKGROUND OF THE DISCLOSURE

Field of the Disclosure

The disclosure relates to bathing water conservation devices and more particularly pertains to a new bathing water conservation device for retaining cold water from a shower head so that it can be used with a toilet.

SUMMARY OF THE DISCLOSURE

An embodiment of the disclosure meets the needs presented above by generally comprising a diverter that is configured to be fluidly couplable to a bathing water conduit. The diverter is positionable between a shut off valve and a spout each fluidly coupled to the bathing water conduit. An outlet conduit is fluidly coupled to the diverter. The diverter diverts water from the bathing water conduit and into the outlet conduit when the diverter detects water in the diverter having a temperature less than a threshold temperature. A storage tank is fluidly coupled to the outlet conduit to receive water from the diverter. An auxiliary conduit is fluidly coupled to the storage tank and is configured to be fluidly coupled to a toilet's water tank to allow the storage tank to supply water to the water tank through the auxiliary conduit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
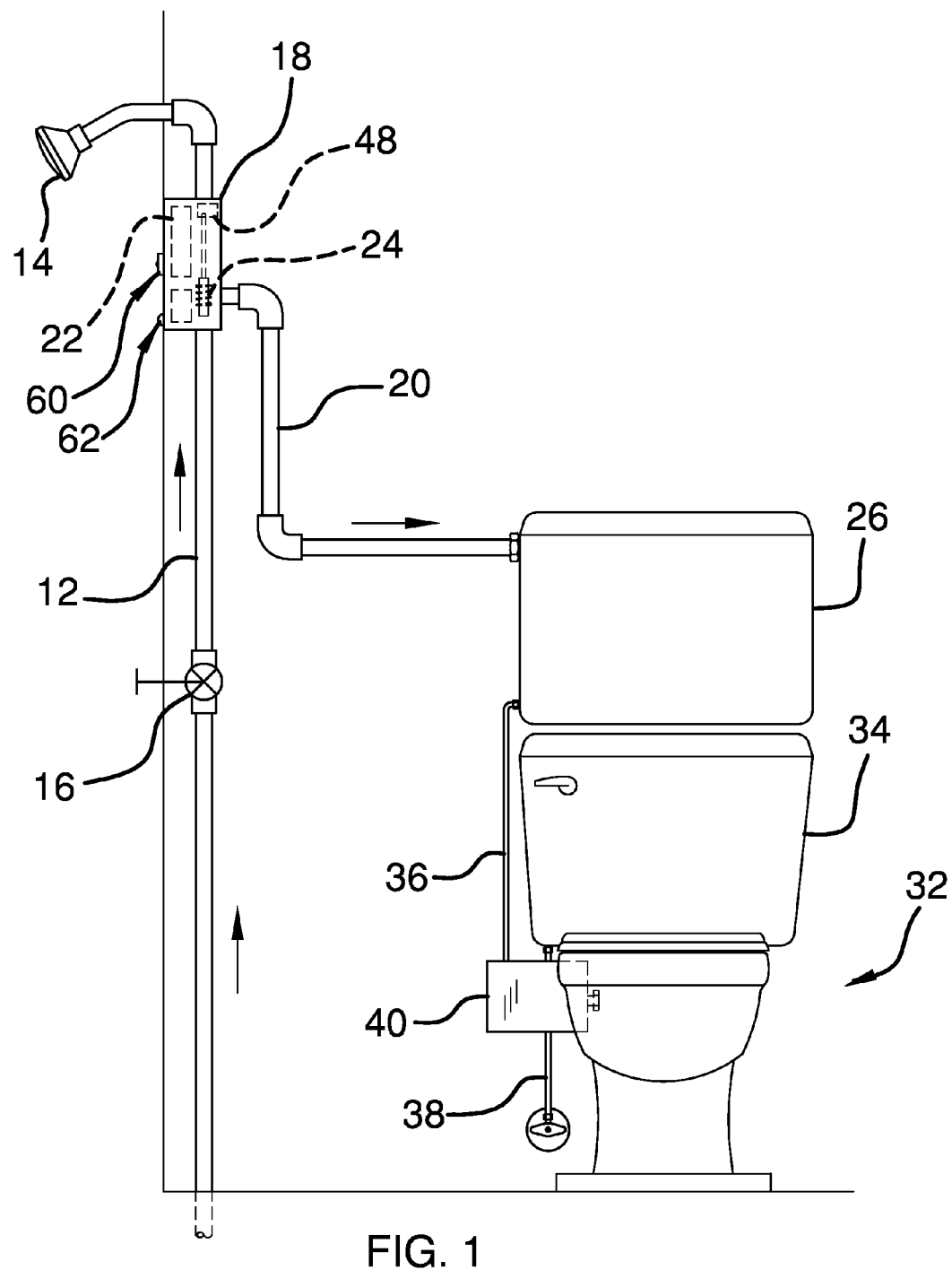
FIG. 1 is a front view of a cold bathing water to toilet diverting apparatus according to an embodiment of the disclosure.
Figure 2:
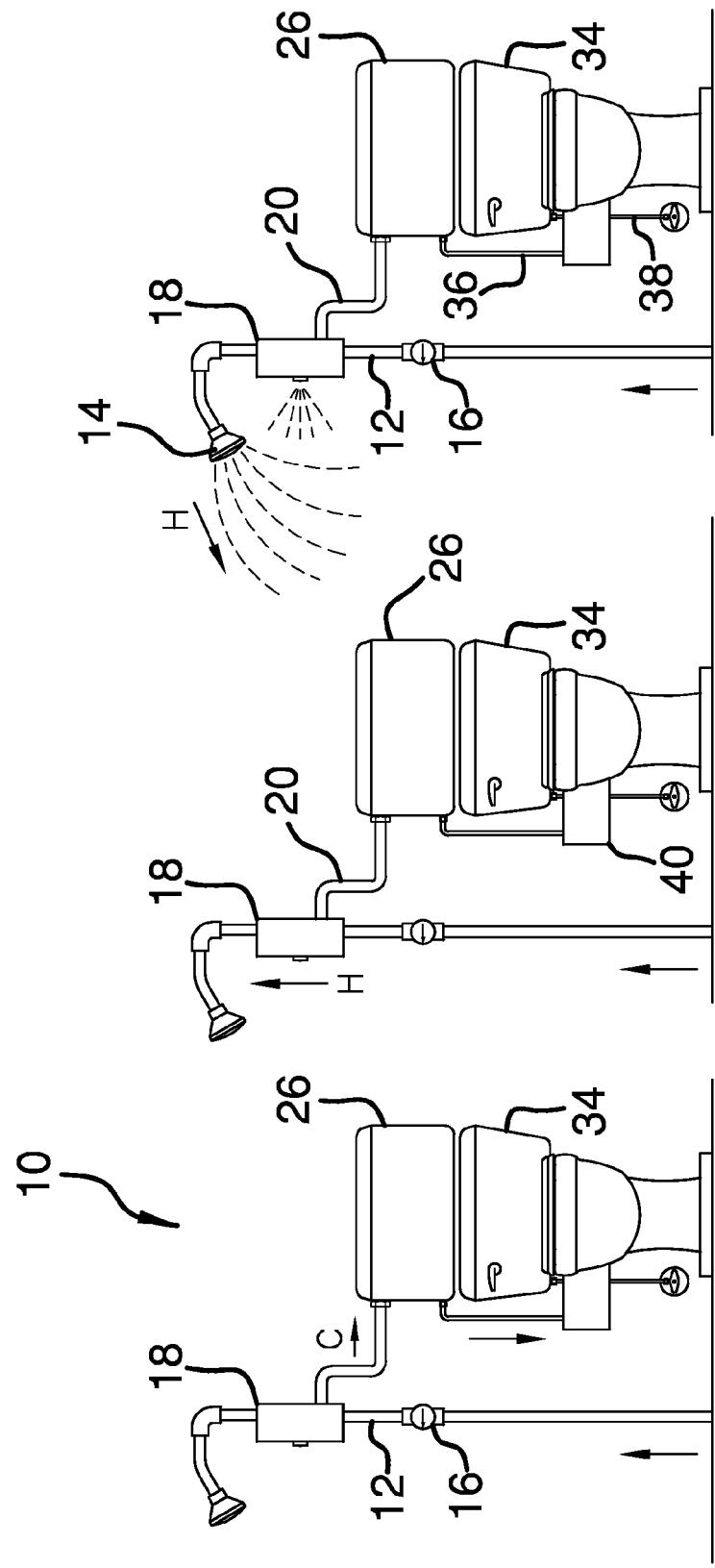
FIG. 2A is a front view of an embodiment of the disclosure showing flow of cold water through the system.
FIG. 2B is a front view of an embodiment of the disclosure showing flow of hot water through the system.
FIG. 2C is a front view of an embodiment of the disclosure showing flow of hot water through the system.
Figure 3:
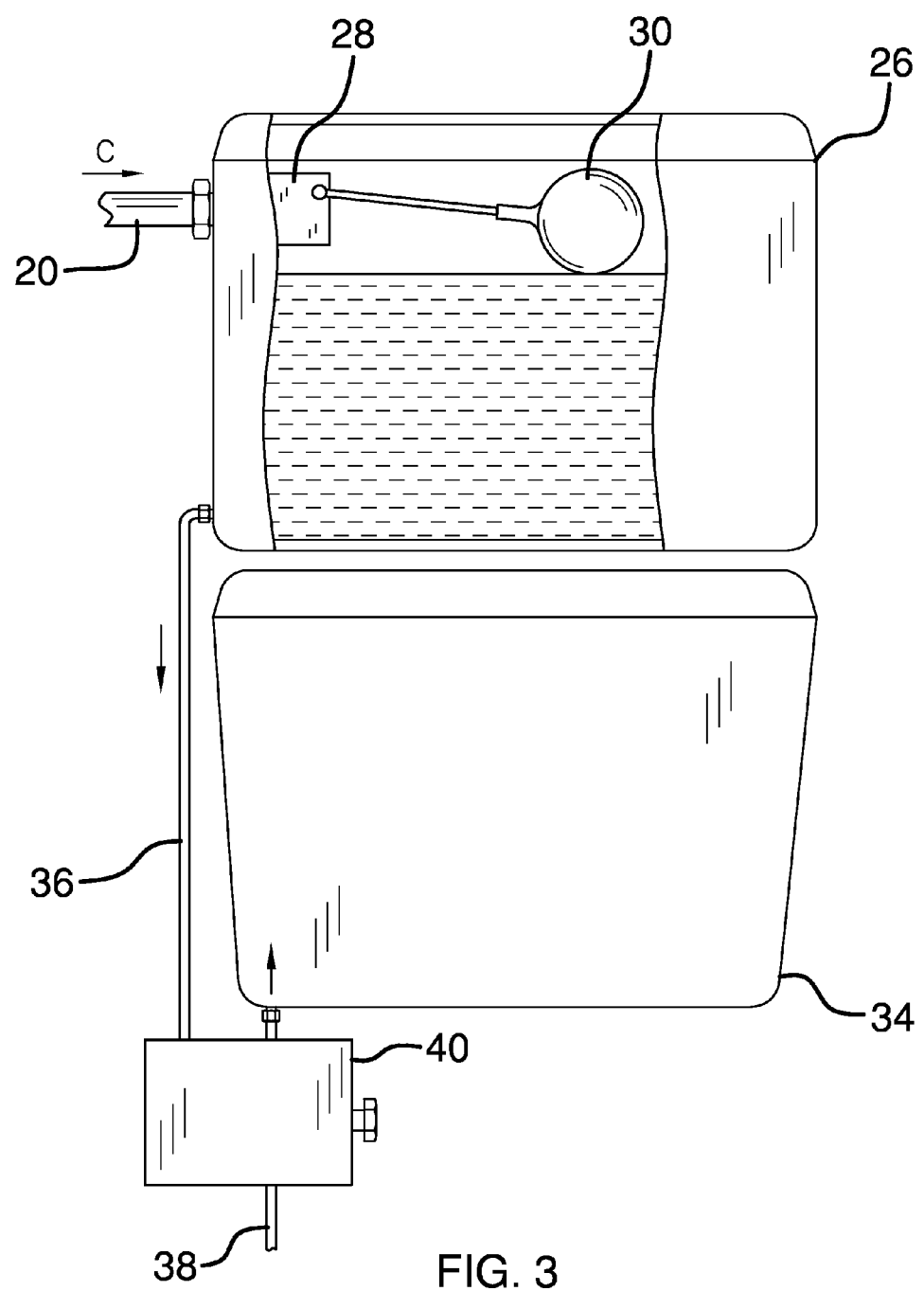
FIG. 3 is a front broken view of an embodiment of the disclosure.
Figure 4:
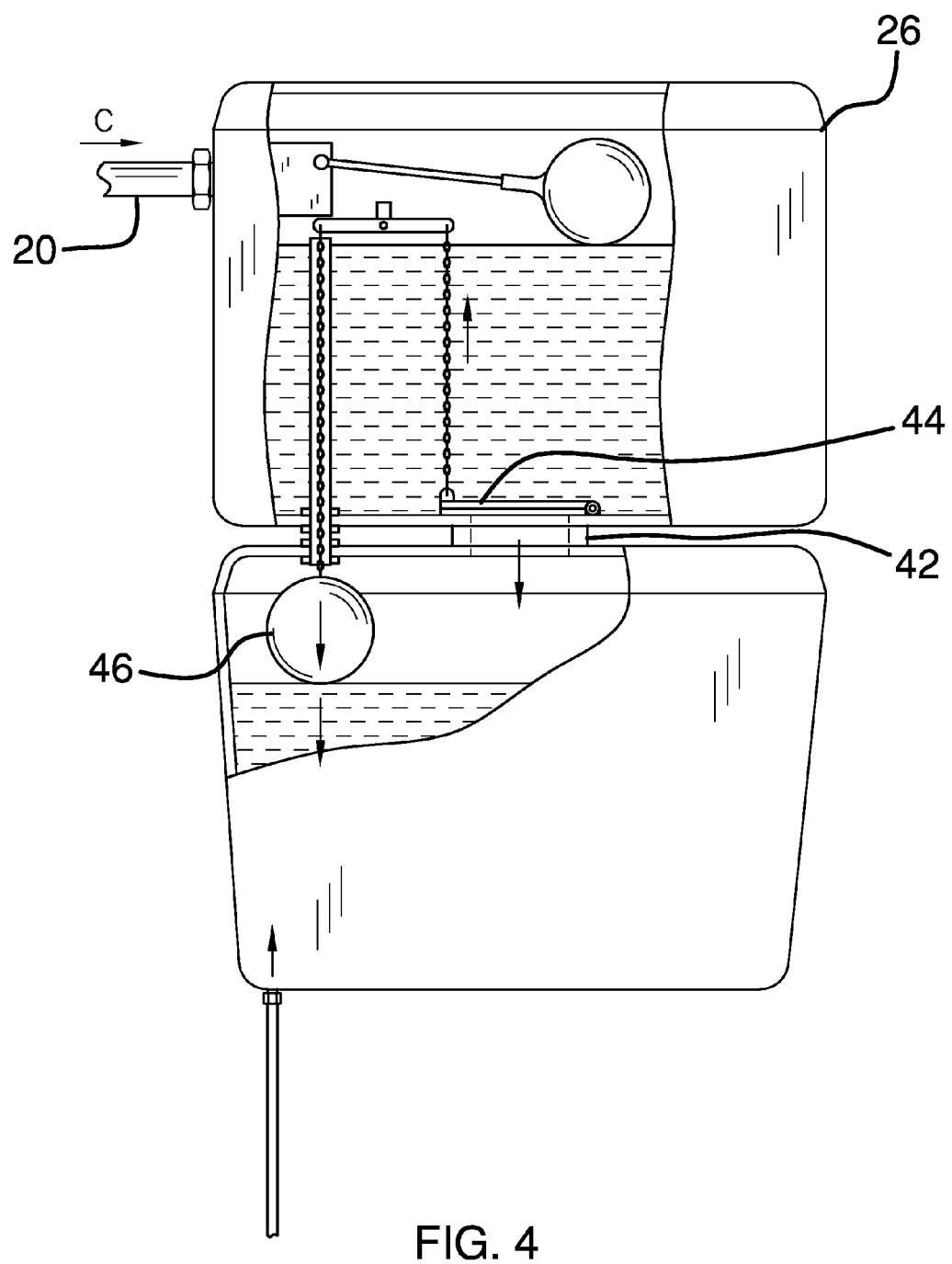
FIG. 4 is a front broken view of an embodiment of the disclosure.

With reference now to the drawings, and in particular to FIGS. 1 through 5 thereof, a new bathing water conservation device embodying the principles and concepts of an embodiment of the disclosure and generally designated by the reference numeral 10 will be described.

As best illustrated in FIGS. 1 through 5, the cold bathing water to toilet diverting apparatus 10 generally comprises a bathing water conduit 12 having an end that has a spout 14 fluidly coupled thereto. The term "spout" is intended to include shower nozzles as well as bathtub spouts. The bathing water conduit 12 would be fluidly coupled to hot and cold water supplies in a conventional manner. A conventional shut off valve 16, such as would be used to also selectively mix hot and cold water supplies, is fluidly coupled to the bathing water conduit 12 to selectively open or close the bathing water conduit 12.

A diverter 18 is in fluid communication with the bathing water conduit 12 and is positioned between the shut off valve 16 and the spout 14. An outlet conduit 20 is fluidly coupled to the diverter 18. The diverter 18 diverts water from the bathing water conduit 12 and into the outlet conduit 20 when the diverter 18 detects that water in the diverter 18 has a temperature less than a threshold temperature. In particular, the diverter 18 includes a thermostat 22 in fluid communication with water in the bathing water conduit 12. The thermostat 22 is electrically coupled to a conventional diversion valve 24, which may be actuated by a solenoid for example, that will divert the water to the outlet conduit 20 when the temperature of the water is less than what would be considered a comfortable bathing temperature. While it is presumed that this temperature may be selectively adjusted by the user of the apparatus 10, it would typically be set to between 32° C. and 42° C. The diversion valve 24 will allow water flow through the bathing water conduit 12 if back pressure on the outlet conduit 20 indicates that the outlet conduit 20 is closed. This may be accomplished by a pressure sensor 21 being in fluid communication with the outlet conduit which is electrically coupled to the diversion valve 24. When the pressure sensor detects a rise in water pressure, it will cause the diversion valve 24 to be actuated to a position allowing flow of water to the spout 14. The diversion valve 24 may be solenoid actuated in a conventional manner. An indicator light 62 may be operationally coupled to the thermostat 22 and positioned for easy viewing by a person to indicate that the temperature of the water is at a selected temperature. The indicator light 62 may include at least two colors such as red to indicate the temperature is within the pre-set range and green to indicate that the temperature is at the user defined setting.

A storage tank 26 is fluidly coupled to the outlet conduit 20 to receive water from the diverter 18. A stop valve 28 is mounted in the storage tank 26 and is fluidly coupled to the outlet conduit 20. The stop valve 28 includes a float 30 and closes the outlet conduit 20 when the storage tank 26 is full to prevent water from the outlet conduit 20 from entering the storage tank 26 until a portion of the water in the storage tank 26 has been released. The term "full" here indicates when the storage tank 26 has been filled to a pre-determined desired level. The diversion valve 24 may be adjustable such that when back pressure from the stop valve 28 is detected, the diversion valve 24 will simply allow water to flow directly through to the spout 14 as stated above.

A conventional toilet 32 is provided which includes a water tank 34. A water supply conduit 38 is fluidly coupled to the toilet 32 and in particular to the water tank 34. An auxiliary conduit 36 is fluidly coupled to the water tank 34 and the storage tank 26. The storage tank 26 supplies water to the water tank 34 through the auxiliary conduit 36 when the storage tank 26 contains water and the water tank 34 is not full.

A priority valve 40 is in fluid communication with the auxiliary conduit 36 and the water supply conduit 38. The priority valve 40 releases water from the storage tank 26 into the water tank 34 when a first pressure exerted on the priority valve 40 by water in the auxiliary conduit 36 overcomes a second pressure exerted on the priority valve 40 by water in the supply conduit 38. The priority valve 40 may be adjustable to selectively increase or decrease a force required by the first pressure to overcome the second pressure. Thus the first pressure need not be greater than the second pressure, but may be set such that as long as there is any water in the auxiliary conduit 36, water will flow from the storage tank 26 into the water tank 34. The priority valve 40 also prevents backflow from the water supply conduit 38 into the storage tank 26. The priority valve 40 may comprise a conventional dual inlet priority valve, such as is found in U.S. Pat. No. 3,970,100, though as mentioned above it may be advantageous to include an adjustable priority valve to fine tune the apparatus 10 with respect to the water pressure from the supply conduit 38.

Figure 5:
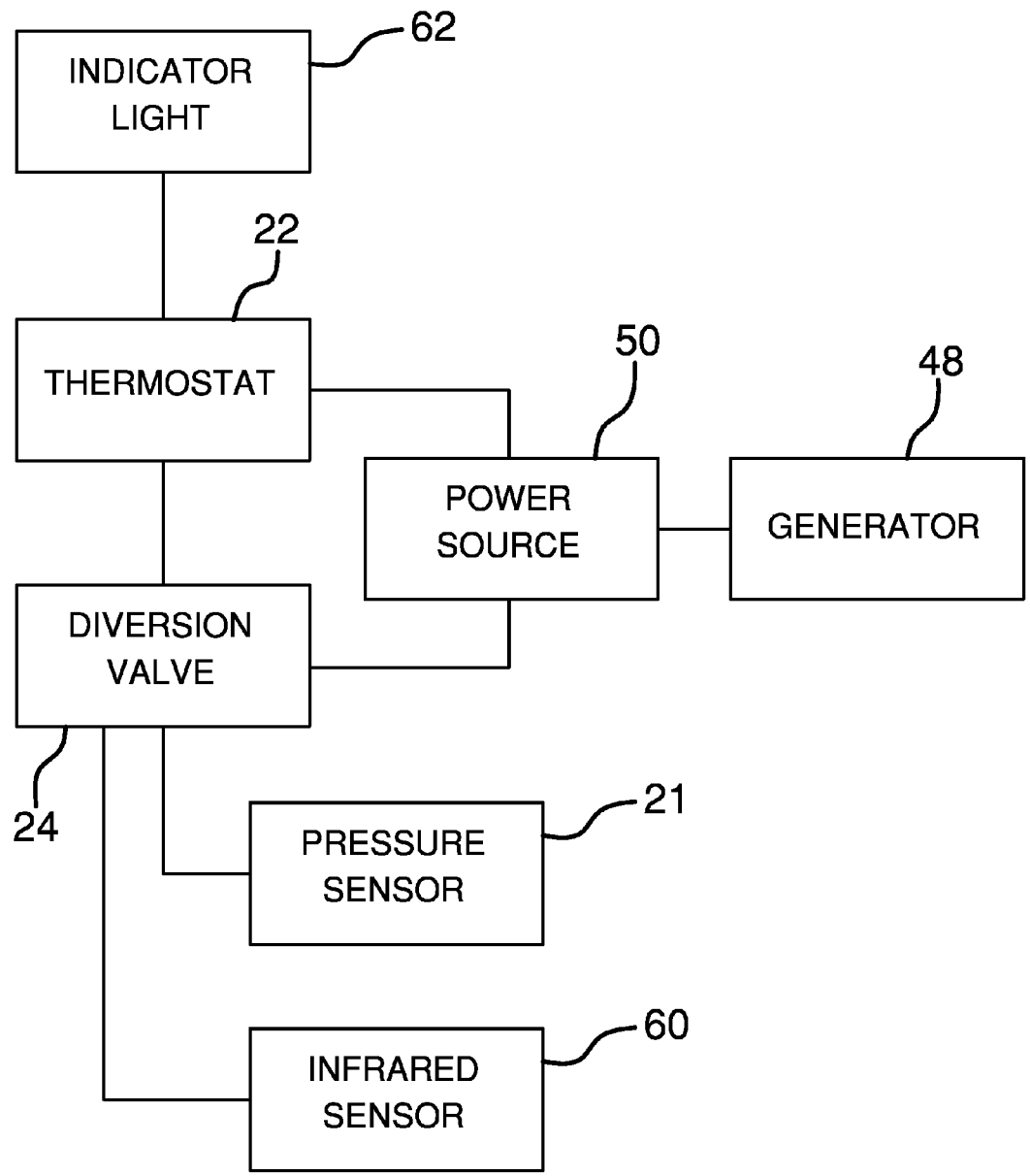
FIG. 5 is a schematic view of an embodiment of the disclosure.

FIG. 5 depicts another embodiment which does not utilize the priority valve 40 but instead places the storage tank 26 directly over the water tank 34. A drain conduit 42 allows the storage tank 26 to drain into the water tank 34. A flap valve 44 covers the drain conduit 42 and is actuated by a float 46 mechanically coupled to the water tank 34 which falls to open to open the flap valve 44 when the water in the water tank 34 lowers.

In addition to or in combination with the apparatus 10, an infrared sensor 60, or other conventional proximity sensing system, may be mounted in close proximity to the spout 14 to detect whether or not a person is adjacent to the spout 14. The infrared sensor 60 could be electrically coupled to the apparatus 10 to close the diverter to prevent water from flowing to the spout 14 until a person is detected or may be used in combination with the shut off valve 16 to again turn off water flow to the spout 14. Essentially, the infrared sensor 60 would be used in combination with thermostat 22 such that the water flow to the spout 14 would be stopped once the water temperature has reached the selected temperature for bathing if a person is not detected by the infrared sensor 60. The infrared sensor 60 may be adjustable to selectively determine the distance the person must be from the spout 14 for water to be allowed to flow outwardly of the spout 14. Alternatively the infrared sensor 60 could be electrically coupled to a secondary valve, not shown, in fluid communication with the bathing water conduit 12 for the same purpose. If such an infrared sensor 60 is utilized, it may be selectively turned on off by a user of the apparatus 10.

The apparatus 10 may further include a conventional hydro-electric generator 48 which is fluidly coupled between the bathing water conduit 12 and the spout 14 and which is electrically coupled to the power source 50 of the thermostat and the diversion valve 24. The power source 50 may comprise a rechargeable battery which is charged by the water moving through the hydro-electric generator 48. In particular, the hydro-electric generator 48 may include an impeller in fluid communication with water flowing to the spout 14. The power source 50 may further include a capacitor to store electrical power for immediate access when the diverter valve 24, or other elements of the apparatus 10, are electrically turned on to prevent a large current pull from the rechargeable battery which would limit the lifespan of the battery.

In use, most persons when bathing, and particularly when taking a shower, do not utilize the first portion of water coming out of the spout 14 as it is too cold to be comfortable. This water is thus wasted and flows down the bath drain. The system 10 retains this water and diverts to the storage tank 26 so that it can be utilized by the toilet 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A water recapturing toilet system comprising:
   a bathing water conduit having an end having a spout fluidly coupled thereto, a shut off valve being fluidly coupled to said bathing water conduit to selectively open or close said bathing water conduit;
   a diverter being in fluid communication with said bathing water conduit and being positioned between said shut off valve and said spout;
   an outlet conduit being fluidly coupled to said diverter;
   said diverter diverting water from said bathing water conduit and into said outlet conduit when said diverter detects water in said diverter having a temperature less than a threshold temperature;
   a storage tank being fluidly coupled to said outlet conduit to receive water from said diverter;
   a toilet including a water tank, a water supply conduit being fluidly coupled to said toilet;
   an auxiliary conduit being fluidly coupled to said water tank and said storage tank, said storage tank supplying water to said water tank through said auxiliary conduit;
   a priority valve being in fluid communication with said auxiliary conduit and said water supply conduit, said priority valve releasing water from said storage tank into said water tank only when a first pressure exerted on said priority valve by water in said auxiliary conduit overcomes a second pressure exerted on said priority valve by water in said supply conduit; and
   a diversion valve and a thermostat, a power supply being electrically coupled to each of said diversion valve and said thermostat, said power supply including a rechargeable battery, a hydro-electric generator being operationally coupled to said power supply and charging said power supply when water moves through said hydro-electric generator, said hydro-electric generator being in fluid communication with water flowing to said spout wherein said diverter includes a diversion valve and a thermostat, a power supply being electrically coupled to each of said diversion valve and said thermostat, said power supply including a rechargeable battery, a hydroelectric generator being operationally coupled to said power supply and charging said power supply when water moves through said hydro-electric generator, said hydroelectric generator being in fluid communication with water flowing to said spout.

2. The system according to claim 1, further including a stop valve being mounted in said storage tank and being fluidly coupled to said outlet conduit to close said outlet conduit when said storage tank is full.

3. The system according to claim 2, wherein said stop valve includes a float to prevent water from said outlet conduit from entering said storage tank until a portion of the water in said storage tank has been released.

4. The system according to claim 1, wherein said priority valve is adjustable to selectively increase or decrease a force required by said first pressure to overcome said second pressure.

5. A water recapturing toilet system comprising:
   a bathing water conduit having an end having a spout fluidly coupled thereto, a shut off valve being fluidly coupled to said bathing water conduit to selectively open or close said bathing water conduit;
   a diverter being in fluid communication with said bathing water conduit and being positioned between said shut off valve and said spout;
   an outlet conduit being fluidly coupled to said diverter;
   said diverter diverting water from said bathing water conduit and into said outlet conduit when said diverter detects water in said diverter having a temperature less than a threshold temperature;
   a storage tank being fluidly coupled to said outlet conduit to receive water from said diverter;
   a stop valve being mounted in said storage tank and being fluidly coupled to said outlet conduit, said stop valve including a float and closing said outlet conduit when said storage tank is full to prevent water from said outlet conduit from entering said storage tank until a portion of the water in said storage tank has been released;
   a toilet including a water tank, a water supply conduit being fluidly coupled to said toilet;
   an auxiliary conduit being fluidly coupled to said water tank and said storage tank, said storage tank supplying water to said water tank through said auxiliary conduit;
   a priority valve being in fluid communication with said auxiliary conduit and said water supply conduit, said priority valve releasing water from said storage tank into said water tank only when a first pressure exerted on said priority valve by water in said auxiliary conduit overcomes a second pressure exerted on said priority valve by water in said supply conduit, said priority valve being adjustable to selectively increase or decrease a force required by said first pressure to overcome said second pressure; and
   a diversion valve and a thermostat, a power supply being electrically coupled to each of said diversion valve and said thermostat, said power supply including a rechargeable battery, a hydro-electric generator being operationally coupled to said power supply and charging said power supply when water moves through said hydro-electric generator, said hydro-electric generator being in fluid communication with water flowing to said spout.

6. A water recapturing apparatus configured to be fluidly coupled to a water tank of a toilet and a bathing water conduit, said apparatus comprising:
   a diverter being configured to be fluidly couplable to the bathing water conduit, said diverter being positionable between a shut off valve and a spout each fluidly coupled to the bathing water conduit;
   an outlet conduit being fluidly coupled to said diverter;
   said diverter diverting water from said bathing water conduit and into said outlet conduit when said diverter detects water in said diverter having a temperature less than a threshold temperature;
   a storage tank being fluidly coupled to said outlet conduit to receive water from said diverter;
   an auxiliary conduit being fluidly coupled to said storage tank, said auxiliary conduit being configured to be fluidly coupled to the water tank to allow said storage tank to supply water to the water tank through said auxiliary conduit; and
   a priority valve being in fluid communication with said auxiliary conduit and being configured to be fluidly coupled to a water supply conduit of the toilet tank, said priority valve releasing water from said storage tank into said water tank only when a first pressure exerted on said priority valve by water in said auxiliary conduit overcomes a second pressure exerted on said priority valve by water in the water supply conduit; wherein said diverter includes a diversion valve and a thermostat, a power supply being electrically coupled to each of said diversion valve and said thermostat, said power supply including a rechargeable battery, a hydroelectric generator being operationally coupled to said power supply and charging said power supply when water moves through said hydro-electric generator, said hydroelectric generator being in fluid communication with water flowing to said spout.

7. The system according to claim 6, further including a stop valve being mounted in said storage tank and being fluidly coupled to said outlet conduit to close said outlet conduit when said storage tank is full.

8. The system according to claim 7, wherein said stop valve includes a float to prevent water from said outlet conduit from entering said storage tank until a portion of the water in said storage tank has been released.

9. The system according to claim 6, wherein said priority valve is adjustable to selectively increase or decrease a force required by said first pressure to overcome said second pressure.

10. The system according to claim 1, wherein said priority valve is positioned outside of said storage tank.

11. The system according to claim 6, wherein said priority valve is positioned outside of said storage tank.

* * * * *